(12) United States Patent
Kuno

(10) Patent No.: US 11,420,510 B2
(45) Date of Patent: Aug. 23, 2022

(54) BATTERY MOUNTED VEHICLE

(71) Applicant: Toyota Jidosha Kabushiki Kaisha, Toyota (JP)

(72) Inventor: Atsunori Kuno, Chigasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 17/124,050

(22) Filed: Dec. 16, 2020

(65) Prior Publication Data
US 2021/0188070 A1 Jun. 24, 2021

(30) Foreign Application Priority Data

Dec. 19, 2019 (JP) .............................. JP2019-229670

(51) Int. Cl.
| | |
|---|---|
| *B60K 1/04* | (2019.01) |
| *B60L 58/26* | (2019.01) |
| *B60K 11/02* | (2006.01) |
| *F28D 15/02* | (2006.01) |
| *H01M 10/625* | (2014.01) |
| *H01M 10/6556* | (2014.01) |

(Continued)

(52) U.S. Cl.
CPC ................ *B60K 1/04* (2013.01); *B60K 11/02* (2013.01); *B60L 58/26* (2019.02); *F28D 15/02* (2013.01); *H01M 10/613* (2015.04); *H01M 10/625* (2015.04); *H01M 10/6556* (2015.04); *H01M 10/6568* (2015.04); *B60K 2001/0438* (2013.01); *H01M 2220/20* (2013.01)

(58) Field of Classification Search
CPC ........... B60K 1/04; B60K 11/02; F28D 15/02; H01M 10/613
See application file for complete search history.

(56) References Cited

U.S. PATENT DOCUMENTS

| | | | |
|---|---|---|---|
| 7,338,335 B1* | 3/2008 | Messano ............ | B60H 1/00428 903/903 |
| 2013/0103242 A1* | 4/2013 | Takeuchi ................. | B60K 6/48 180/65.265 |
| 2017/0082335 A1* | 3/2017 | Jin ........................ | B60H 1/3232 |

(Continued)

FOREIGN PATENT DOCUMENTS

JP 2019-052837 A 4/2019

*Primary Examiner* — Jonathan Ng
*Assistant Examiner* — James J Triggs
(74) *Attorney, Agent, or Firm* — Dinsmore & Shohl LLP

(57) ABSTRACT

A battery-mounted vehicle according to an example of the present disclosure accommodates one or a plurality of batteries under the floor panel. The battery-mounted vehicle includes a battery-cooler unit, a condenser, a refrigerant liquid pipe, and a plurality of refrigerant gas pipes. The refrigerant liquid pipe guides the refrigerant liquid from the condenser to the battery-cooler unit. The refrigerant gas pipe guides the refrigerant gas generated by vaporization of the refrigerant liquid from the battery-cooler unit to the condenser. The plurality of refrigerant gas pipes include a first and a second refrigerant gas pipes. The first refrigerant gas pipe extends in a first direction from the battery-cooler unit to the condenser, and connects the condenser and the battery-cooler unit. The second refrigerant gas pipe extends from the battery-cooler unit in a second direction opposite to the first direction, and is connected to the condenser by being bended or curved.

12 Claims, 11 Drawing Sheets

(51) Int. Cl.
*H01M 10/6568* (2014.01)
*H01M 10/613* (2014.01)

(56) References Cited

U.S. PATENT DOCUMENTS

| | | | |
|---|---|---|---|
| 2018/0029436 A1* | 2/2018 | Zaeri | B60H 1/00428 |
| 2019/0360433 A1* | 11/2019 | Poolman | F25B 19/005 |
| 2020/0205318 A1* | 6/2020 | Hulse | H05K 7/2029 |

* cited by examiner

BATTERY MOUNTED VEHICLE

CROSS-REFERENCE TO RELATED APPLICATION

The present application claims priority under 35 U.S.C. § 119 to Japanese Patent Application No. 2019-229670, filed Dec. 19, 2019, the contents of which are incorporated herein by reference in their entirety.

TECHNICAL FIELD

An example in the present disclosure relates to a battery-mounted vehicle in which one or more batteries are accommodated under a floor panel of the vehicle.

BACKGROUND

Regarding a battery-mounted vehicle in which a plurality of batteries are accommodated under a floor panel, it is studied for mounting an ebullient cooling device which cools the batteries by heat exchange with a refrigerant liquid. In such an ebullient cooling device, the refrigerant liquid is conveyed through a refrigerant liquid pipe from a condenser condensing the refrigerant gas to a cooler adjacent to the battery. In the cooler, heat is exchanged between the battery and the internal refrigerant liquid, and the refrigerant liquid absorbs the heat of the battery and vaporizes. The refrigerant gas generated by vaporization of the refrigerant liquid is returned again to the condenser again through the refrigerant gas pipe. JP2019-052837A discloses an example of a structure of an ebullient cooling device that can be mounted on a battery-mounted vehicle. The battery-mounted vehicle disclosed in JP2019-052837A mounts a battery stack in which a plurality of battery cells are stacked. In the present disclosure, "battery" may be a battery stack or may be a single battery cell.

When the ebullient cooling device is mounted on a vehicle, an inclination of the road surface and acceleration and deceleration of the vehicle may cause a deviation in a liquid level of the refrigerant liquid in the ebullient cooling device. When the liquid level of the refrigerant liquid is inclined in the ebullient cooling device, the connection portion between the refrigerant gas pipe and the cooler is possibly immersed in the refrigerant liquid. The submersion of the connection portion hinders the flow of the refrigerant gas vaporized in the cooler to the refrigerant gas pipe.

In the known art described in JP2019-052837A, for example, as shown in FIG. 1 of JP2019-052837A, two refrigerant gas pipes (gas phase paths) are provided in an ebullient cooling device. A first connecting portion at which one of the two refrigerant gas pipes (first gas phase path) connects to a cooler (equipment temperature regulating unit), and a second connecting portion at which the other of two refrigerant gas pipes (second gas phase path) is connected to the cooler (equipment temperature regulating unit) are provided at a distance in the horizontal direction. According to such a configuration, when one connecting portion of the first and the second connecting portions is located on lower side in the gravity direction by the inclination of the vehicle, the other connecting portion is located on upper side in the gravity direction. Therefore, since one connecting portion locates above the liquid level even when the other connecting portion is immersed in the refrigerant liquid, the flow of the refrigerant gas to the refrigerant gas pipe is easily maintained.

SUMMARY

When the vehicle travels on a rugged road, or when the vehicle shifts from rapid acceleration to rapid deceleration or from rapid deceleration to rapid acceleration, an ebullient cooling device mounted on the vehicle inclines to the rear direction after inclining to the front direction, or inclines to the front direction after inclining to the rear direction. In accordance with the change in the inclination of the ebullient cooling device, the inclination of the liquid level of the refrigerant liquid in the ebullient cooling device also changes.

In the case of the above known art, although the second connecting portion is immersed under the liquid level of the refrigerant liquid by the inclination of the ebullient cooling device at a certain moment, at the next moment, by the change in the inclination of the boiling cooling device, the first connecting portion is supposed to be immersed under the liquid level of the refrigerant liquid and the second connecting portion is supposed to be above the liquid level. At this time, although the second connecting portion is not immersed, the refrigerant liquid which flowed into the refrigerant gas pipe (that is, second gas phase path) when the second connecting portion is immersed does not escape. Therefore, the refrigerant liquid possibly accumulates in both of the two refrigerant gas pipes. That is, even in the above known art, the possibility of deterioration in cooling performance due to accumulation of the refrigerant liquid in the refrigerant gas pipe remains.

An example in the present disclosure has been conceived in consideration of the above described problem, and an object thereof is to provide a battery-mounted vehicle. In the battery-mounted vehicle, one or more batteries are accommodated under a floor panel. The batteries is cooled by an ebullient cooling device. The battery-mounted vehicle is possible to suppress deterioration of cooling performance due to accumulation of the refrigerant liquid in the refrigerant gas pipe without sacrificing the mountability of the ebullient cooling device.

A battery-mounted vehicle according to an example of the present disclosure accommodates one or a plurality of batteries under the floor panel. The battery-mounted vehicle includes a battery-cooler unit, a condenser, a refrigerant liquid pipe, and a plurality of refrigerant gas pipes. The battery-cooler unit is a structure in which one or more coolers are attached to one or more batteries. In the battery-cooler unit, the one or more batteries are cooled by heat exchange between the one or more batteries and refrigerant liquid in the one or more coolers. The condenser is an apparatus for condensing the refrigerant gas by heat radiation so as to obtain a refrigerant liquid, and is disposed at a position horizontally away from the battery-cooler unit. The refrigerant liquid pipe guides the refrigerant liquid from the condenser to the battery-cooler unit. The refrigerant gas pipe guides the refrigerant gas generated by vaporization of the refrigerant liquid from the battery-cooler unit to the condenser. Whereas at least one refrigerant liquid pipe is provided, a plurality of the refrigerant gas pipes are provided. The cooler, the condenser, the refrigerant liquid pipe and the refrigerant gas pipes constitute an ebullient cooling device for cooling the cooling object by vaporization of the refrigerant liquid.

A plurality of refrigerant gas pipes include a first refrigerant gas pipe and a second refrigerant gas pipe. The first refrigerant gas pipe extends in a first direction from the battery-cooler unit to the condenser, and connects the condenser and the battery-cooler unit. The second refrigerant gas pipe extends from the battery-cooler unit in a second direction opposite to the first direction, and is connected to the condenser by bended or curved a plurality of times. According to an embodiment of the battery-cooler unit, the battery-cooler unit includes a shared refrigerant gas pipe to which a plurality of the cooler is connected in parallel. The first refrigerant gas pipe is connected to the end of the first direction side of the shared refrigerant gas pipe. The second refrigerant gas pipe is connected to the end of the second direction side of he shared refrigerant gas pipe. The second refrigerant gas pipe, in particular, extends upwardly through the gap of the member constituting the upper portion of the vehicle from a first position below the floor panel, folds back at a second position above the floor panel and retunes downward, and extends toward the condenser from a third position below the floor panel.

According to the above configuration, the second refrigerant gas pipe is provided separately from the first refrigerant gas pipe. Thereby, the refrigerant gas is possibly returned from the second refrigerant gas pipe to the condenser when the refrigerant liquid flows into the first refrigerant gas pipe. Further, the second refrigerant gas pipe extends above the floor panel from below the floor panel, and extends toward the condenser after returning under the floor panel. Thereby, the refrigerant liquid is prevented from accumulating in the second refrigerant gas pipe when the vehicle is greatly inclined. Furthermore, the second refrigerant gas pipe extends upward through the gap of the member constituting the upper portion of the vehicle. Thereby, it is suppressed that the second refrigerant gas pipe affects the cabin space.

The member constituting the upper portion of the vehicle in which the second refrigerant gas pipe passes through the gap may be a member constituting skeleton or outer shell of the vehicle. That is, the second refrigerant gas pipe may be passed by effectively utilizing the clearance of the skeleton or the outer shell of the vehicle. For example, the second refrigerant gas pipe may be disposed along a wheel house. Specifically, the second refrigerant gas pipe may extend upward through a gap formed between a wheel house inner cover provided inside of the wheel house for protecting the wheel house and a panel constituting the wheel house, may fold back in the gap, and may extend downward. The second refrigerant gas pipe may extend upward through a gap formed between a first panel constituting the outer shell of the vehicle and a second panel constituting the wheel house, may fold back in the gap and may extend downward. According to this configuration, the second refrigerant gas pipe is possibly protected by the skeleton or the outer shell of the vehicle while effectively utilizing available space.

The first panel constituting the outer shell of the vehicle and the second panel constituting the wheel house is provided on the each of left side and right side of the vehicle. In one of the left side or the right side, if a charger for charging a plurality of battery stack is disposed in the gap formed between the first and the second panels, the second refrigerant gas pipe may be disposed in the gap formed between the first and the second panels in the other of the left side or the right side. According to such an arrangement, interference between the charger and the second refrigerant gas pipe is prevented, it is possible to improve the mountability of both the charger and the second refrigerant gas pipe.

The second refrigerant gas pipe may be disposed in a pillar extending in the vertical direction of the vehicle. That is, the second refrigerant gas pipe may be passed by effectively utilizing the space in the pillar. The pillar through which the second refrigerant gas pipe is passed, may be a rear pillar of the rear side, a front pillar of the front side, or a central pillar of the center, depending on the first position where the second refrigerant gas pipe rises. According to such an arrangement, the second refrigerant gas pipe is possibly extended to a high position of the vehicle and the second refrigerant gas pipe is protected by the pillar constituting the skeleton of the vehicle.

The member constituting the upper portion of the vehicle in which the second refrigerant gas pipe is passed through the gap may be a member constituting the interior of the vehicle. That is, the second refrigerant gas pipe may be passed by effectively utilizing the gap of the interior of the vehicle. For example, the second refrigerant gas pipe may be passed such as, under an interior panel to form a design surface of the vehicle interior, under a rear seat, under the back of a dashboard, and under a console. By passing the second refrigerant gas pipe inside the vehicle, it is possible to protect the second refrigerant gas pipe from impact from the outside. Since the second refrigerant gas pipe is passed through the gap of the interior of the vehicle, the influence on the cabin space is suppressed.

The second refrigerant gas pipe may be disposed such that the distance from a connection to the battery-cooler unit to the second position is larger than the distance from a connection to the battery-cooler unit to the first position. According to such an arrangement of the second refrigerant gas pipe, when the vehicle swings back and forth, it may be prevent the refrigerant liquid form entering the side of the third position beyond the second position from the first position.

The second refrigerant gas pipe may extend from the third position to the condenser through a floor tunnel formed by being raised from the floor panel. According to such an arrangement of the second refrigerant gas pipe, the second refrigerant gas pipe is protected from impact from the outside while effectively utilizing available space in the floor tunnel.

The second refrigerant gas pipe may extend from the third position to the condenser through the gap between a skeleton member or a reinforcing member which extends in the longitudinal direction of the vehicle and is disposed on the side of the vehicle under the floor panel, and a battery housing chamber for accommodating the battery stack. According to such an arrangement of the second refrigerant gas pipe, while effectively utilizing available space between the skeleton member or the reinforcing member under the floor panel of the vehicle and the battery housing chamber, the skeleton member or the reinforcing member may protect the second refrigerant gas pipe from impact from the outside.

As described above, according to the battery-mounted vehicle according to an example in the present disclosure, the reduction in cooling performance due to the refrigerant liquid being accumulated in the refrigerant gas pipe is possibly suppressed without sacrificing the mountability of the ebullient cooling device.

DESCRIPTION OF EMBODIMENTS

Embodiments in the present disclosure will be described with reference to drawings. However, even if the numbers (such as the number, the quantity, the range, or the like) of the each elements are referred in the following embodiments, other examples in the present disclosure are not limited to the number, unless specifically stated or obviously identified in principle. In addition, the structure described in the embodiments described below are not limited to other examples in the present disclosure unless otherwise specified or clearly specified in principle.

1. Structure of Battery Pack

The battery pack 2 according to the present embodiment will be described with reference to FIG. 1. Arrows FR, UP, and RH indicating directions in each drawing including FIG. 1 will be described. The arrow FR points forward in the front-back direction of a vehicle, the arrow UP points upward in the up-down direction of the vehicle, the arrow RH points to right from a viewpoint of an occupant in a state of boarding the vehicle. The opposite direction of each arrow FR, UP, RH indicates the back, lower, left of the vehicle, respectively. Hereinafter, when the directions are described by simply using the "front-back", the "left-right" and the "up-down" respectively, the directions mean respectively the front-back direction of the vehicle, the left-right direction of the vehicle and the up-down direction of the vehicle, unless otherwise specified.

Figure 1:
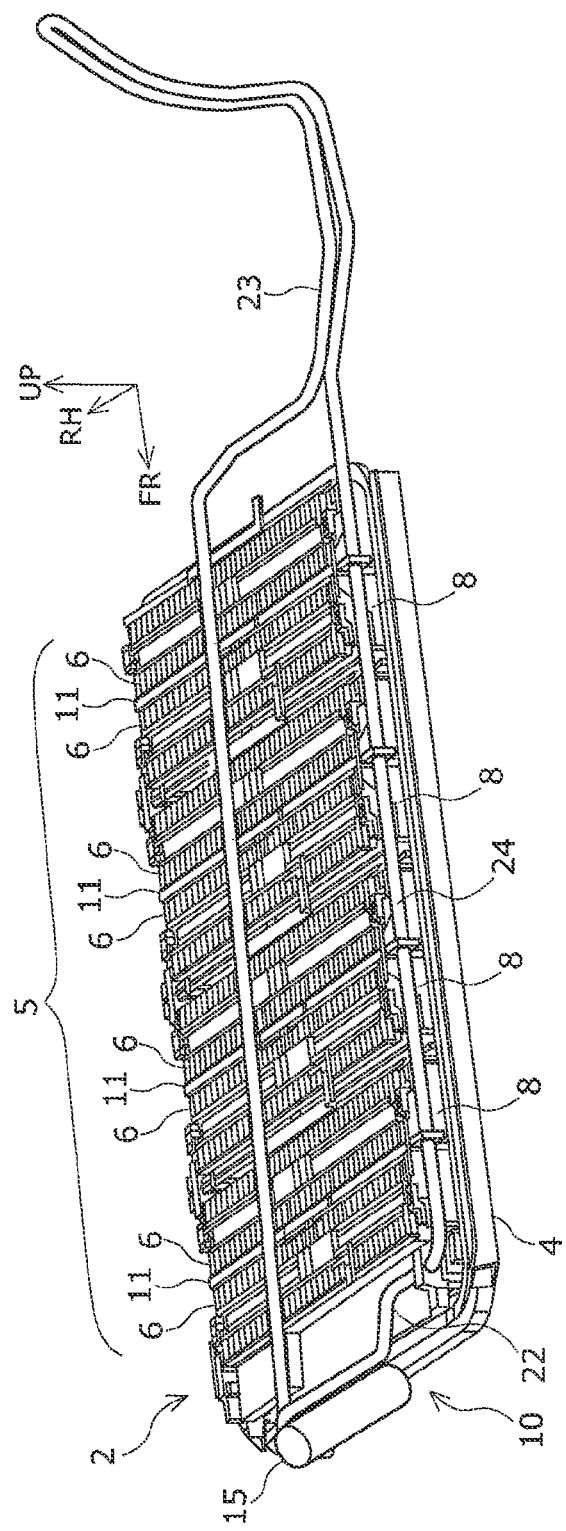
FIG. 1 is a perspective view illustrating a structure of a battery pack to which an ebullient cooling device according to an embodiment in the present disclosure is applied.

FIG. 1 is a perspective view illustrating a structure of a battery pack 2 according to the present embodiment. The battery pack 2 is configured to be detachable for the vehicle (not shown). FIG. 1 illustrates an appearance of the battery pack 2 in a state of being removed from the vehicle. In FIG. 1, the mounting direction when the battery pack 2 is mounted on the vehicle is indicated by using the arrow FR, UP, RH. The battery pack 2 is mounted such that the longitudinal direction of the battery pack 2 is parallel to the front-back direction of the vehicle.

The battery pack 2 includes a plurality of battery stacks 6 and a tray 4 for accommodating them. For example, in FIG. 1, there are six battery stacks 6. The battery stacks 6 are arranged side by side on the tray 4 such that the longitudinal direction of each battery stack 6 is parallel to the left-right direction of the vehicle. Each battery stack 6 is configured by stacking a plurality of battery cells in the longitudinal direction of the battery stack 6. The battery cell is, for example, a lithium ion battery, a nickel metal hydride battery, an all-solid-state battery, a lead battery, or the like. The plurality of the stacked battery cells are accommodated in the tray 4 in a state where both end portions in the longitudinal direction of the battery stack 6 is held by end plates 8. Although the battery provided in the battery pack 2 according to the present embodiment is the battery stack 6, a large battery cell which is not stacked may be provided. Although the battery pack 2 is provided with an electric device such as an electronic control unit (ECU) and a power distribution facility such as an electric cable, they are omitted in FIG. 1 for convenience of explanation. Although the battery pack 2 is also provided with a cover covering the top of the battery stacks 6, the cover is not drawn in FIG. 1 in order to illustrate the inside of the battery pack 2.

In the battery pack 2 according to the present embodiment, an ebullient cooling device 10 is used for cooling the battery stacks 6 which generate heat during use. The ebullient cooling device 10 includes coolers 11 having substantially the same length as the battery stack 6 in the left-right direction of the vehicle. Two of the battery stacks 6 are formed into one set, and each set is assigned each cooler 11. Specifically, in one battery module, the two battery stack 6 and the one cooler 11 sandwiched therebetween are held from the both ends by the end plate 8. Then, one battery-cooler unit 5 is configured by connecting the plurality of battery modules by a common pipe. In FIG. 1, a common refrigerant gas pipe 24 is illustrated as the common pipe. In FIG. 1, the battery pack 2 includes the battery-cooler unit 5 having the four battery modules.

As will be described in detail later, the ebullient cooling device 10 includes a condenser 15. The condenser 15 is disposed on the front end portion of the battery pack 2. The ebullient cooling device 10 also includes a plurality of pipes connecting the battery-cooler unit 5 and the condenser 15. Pipes 22 and 23 in FIG. 1 are parts of the pipes provided in the ebullient cooling device 10. As shown in FIG. 1, a part of the pipe 23 constituting the ebullient cooling device 10 is not housed in the battery pack 2, and is extended to the outside of the battery pack 2.

2. Structure of Ebullient Cooling Device

Figure 2:
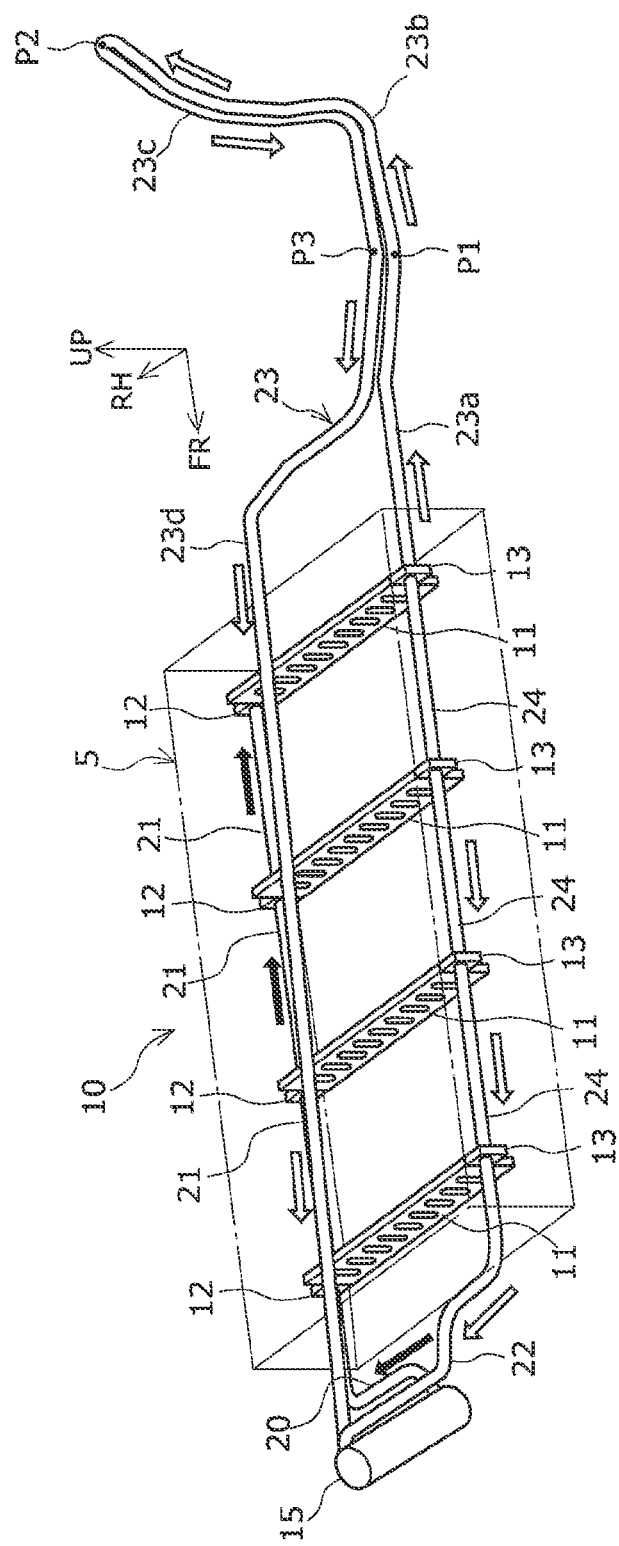
FIG. 2 is a perspective view illustrating a structure of the ebullient cooling device according to the embodiment in the present disclosure.

FIG. 2 is a perspective view illustrating the structure of the ebullient cooling device 10. The ebullient cooling device 10, utilizing absorption of vaporization heat necessary for phase change from liquid phase to gas phase when refrigerant liquid vaporizing, is a device for cooling the battery stacks 6 by depriving the heat from the battery stacks 6 (see FIG. 1). For example, R134 or R1234yf used in an automobile air conditioner is used as the refrigerant of the ebullient cooling device 10.

Heat exchange between the battery stacks 6 and the refrigerant liquid is performed by the coolers 11 constituting the battery-cooler unit 5. The ebullient cooling device 10 includes the four coolers 11 corresponding to each battery module. The adjacent coolers 11 are connected to each other by a common refrigerant liquid pipe 21 and a common refrigerant gas pipe 24 to be described later. Each cooler 11 is a plate-shaped hollow structure. The side surface of each battery stack 6 are respectively fixed on both sides of each cooler 11 in the front-back direction of the vehicle. Between each cooler 11 and each battery stack 6, a plate material having electrical insulation and high thermal conductivity is sandwiched. However, if the electrical insulation is sufficiently ensured, each cooler 11 and each battery stack 6 may be in direct contact.

The ebullient cooling device 10 condenses and returns the refrigerant gas vaporized by the coolers 11 back to the refrigerant liquid, and supplies the refrigerant liquid again to the coolers 11. The condenser 15 is a heat exchanger for condensing the refrigerant gas by heat dissipation. The condenser 15 is incorporated in a refrigerant circulation system of an automobile air conditioner to be described later, and radiates heat from the refrigerant gas of the ebullient cooling device 10 by heat exchange with the refrigerant liquid for an automobile air conditioner. The condenser 15 is installed at a position higher than the coolers 11 in the up-down direction of the vehicle. The condenser 15, by being disposed in the front end portion of the battery pack 2, is located at a place apart from the cooler 11 in the horizontal direction.

Each cooler 11, on one end of its longitudinal direction (in FIG. 2, the right end in the left-right direction of the vehicle), has a refrigerant liquid introducing portion 12 where the refrigerant liquid is introduced. Each refrigerant liquid introducing portion 12 is provided below the central in the height direction of each cooler 11. The common refrigerant liquid pipe 21 connects the refrigerant liquid introducing portions 12 of the four coolers 11.

The ebullient cooling device 10 includes a refrigerant liquid pipe 20 for guiding the refrigerant liquid from the condenser 15 to the battery-cooler unit 5. The refrigerant liquid pipe 20 is connected to the refrigerant liquid introducing portion 12 closest to the condenser 15, i.e., the end in the front direction of the vehicle of the common refrigerant liquid pipe 21. The refrigerant liquid pipe 20 is connected to a bottom or a position close to the bottom of the condenser 15.

Each cooler 11, on the other end in the longitudinal direction (in FIG. 2, the left end in the left-right direction of the vehicle), has a refrigerant gas discharging portion 13 where the refrigerant gas is discharged. Each refrigerant gas discharging portion 13 is provided above the central in the height direction of each cooler 11. The common refrigerant gas pipe 24 connects the refrigerant gas discharging portions 13 of the four coolers 11. Specifically, the common refrigerant gas pipe 24 extends to the front direction of the vehicle starting from the refrigerant gas discharging portion 13 of the rear cooler 11 in the front-back direction of the vehicle, and connects the refrigerant gas discharging portion 3 of the third cooler 11, the refrigerant gas discharging portion 13 of the second cooler 11, and the refrigerant gas discharging portion 13 of the leading cooler 11 in order.

The ebullient cooling device 10 includes the refrigerant gas pipes 22, 23 for guiding the refrigerant gas, which is generated by vaporization of the refrigerant liquid, from the battery-cooler unit 5 to the condenser 15. Whereas the refrigerant liquid pipe 20 is one, a plurality of the refrigerant gas pipes 22 and 23 are provided. Specifically, a first refrigerant gas pipe 22 is a main refrigerant gas pipe, and a second refrigerant gas pipe 23 is a sub refrigerant gas pipe. The first refrigerant gas pipe 22 connects the refrigerant gas discharging portion 13 closest to the condenser 15 (i.e., the end in front side of the vehicle of the common refrigerant gas pipe 24) to the condenser 15. The connection position to the condenser 15 of the first refrigerant gas pipe 22 is higher than the connection position of the refrigerant liquid pipe 20 to the condenser 15. The height difference between the two connection positions is provided.

The second refrigerant gas pipe 23 extends in the direction opposite to the first refrigerant gas pipe 22, starting from the refrigerant gas discharging portion 13 of the rear cooler 11 in the front-back direction of the vehicle, and connects to the condenser 15 after bending or curving a plurality of times. The connection position to the condenser 15 of the second refrigerant gas pipe 23 is the same position as the connection position to the condenser 15 of the first refrigerant gas pipe 22. The second refrigerant gas pipe 23 is divided into four portions 23a, 23b, 23c, and 23d. Details of the configuration of the second refrigerant gas pipe 23 will be described later.

Figure 3:
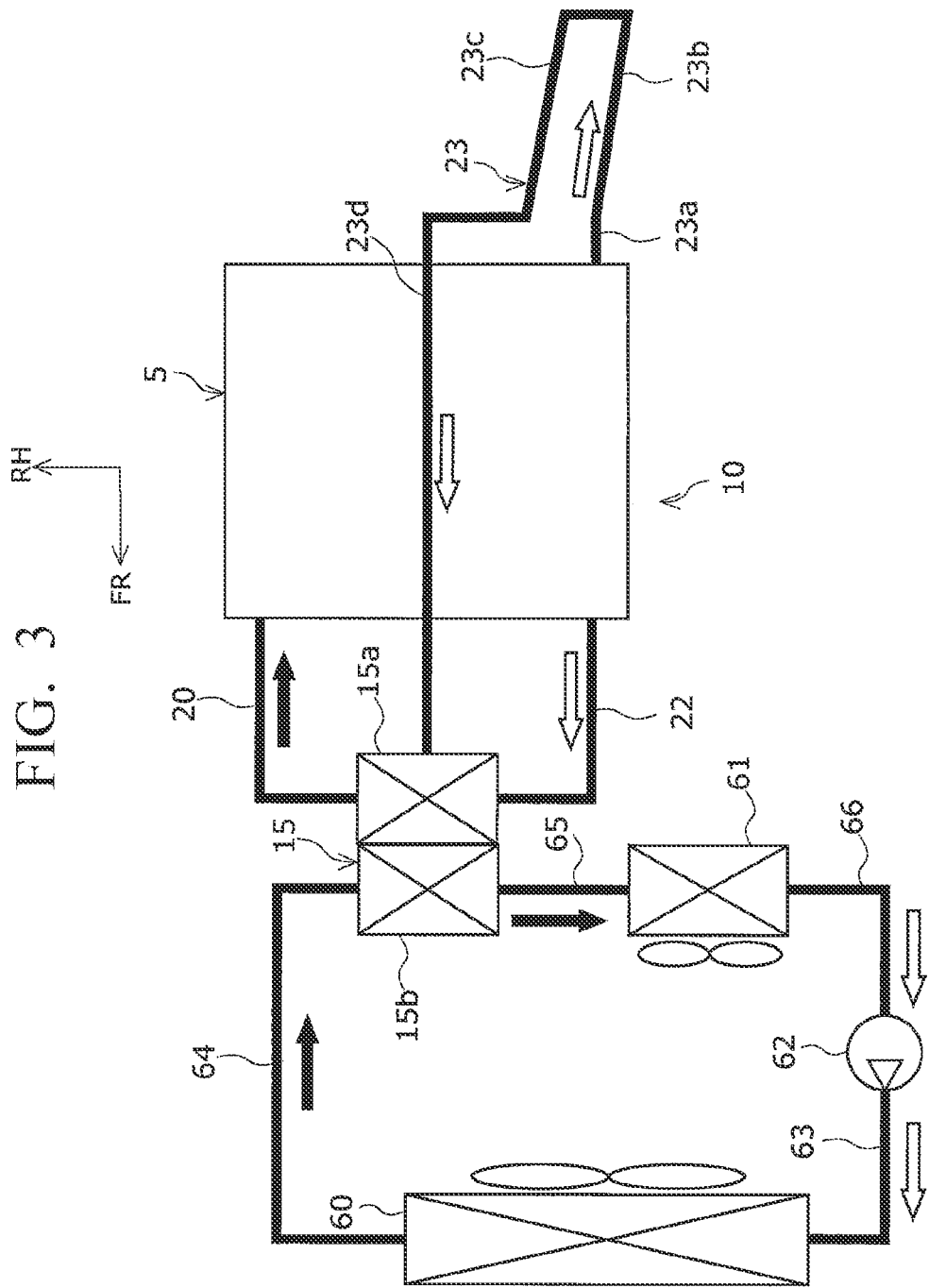
FIG. 3 is a diagram illustrating a configuration of a heat exchange system according to the embodiment in the present disclosure.

Here, a configuration of a heat exchange system for causing the condenser 15 to function will be described with reference to FIG. 3. FIG. 3 illustrates the refrigerant circulation system of the automobile air conditioner together with the refrigerant circulation system of the ebullient cooling device 10. The condenser 15 includes a battery-side heat exchanger 15a which is incorporated in the refrigerant circulation system of the ebullient cooling device 10, and an air conditioner-side heat exchanger 15b which is incorporated in the refrigerant circulation system of the automobile air conditioner. The refrigerant liquid pipe 20 and the refrigerant gas pipes 22 and 23 are connected to the battery-side heat exchanger 15a.

The refrigerant circulation system of the automobile air conditioner includes a capacitor 60, an evaporator 61, a compressor 62 and a refrigerant pipes 63, 64, 65, and 66 for connecting them. The air conditioner-side heat exchanger 15b of the condenser 15, for example, is disposed between the capacitor 60 and the evaporator 61. Heat exchange between the refrigerant liquid for air conditioner passing through the air conditioner-side heat exchanger 15b and the refrigerant gas for battery cooling guided from the first refrigerant gas pipe 22 and the second refrigerant gas pipe 23 to the battery-side heat exchanger 15a is performed.

2. Device of Ebullient Cooling Device

The operation of the ebullient cooling device 10 having the above-described configuration will be described again with reference to FIG. 2. In the ebullient cooling device 10, when the temperature of the battery stacks 6 (see FIG. 1) is increased by self-heating during running of the vehicle, the heat is conducted from the battery stacks 6 having high temperature to the coolers 11 having the low temperature. In the coolers 11, a part of the refrigerant liquid is vaporized by absorbing heat from the battery stacks 6. When the refrigerant liquid in the coolers 11 is vaporized, by depriving the vaporization heat from the battery stacks 6, the temperature of the battery stacks 6 is reduced.

The refrigerant gas generated by the refrigerant liquid being vaporized in the coolers 11 is discharged from the coolers 11 through the refrigerant gas discharging portions 13 to the common refrigerant gas pipe 24. The pressure in the cooler 11 which is increased by the phase change of the refrigerant liquid to the refrigerant gas becomes a driving force, thus, the refrigerant gas is sent from the common refrigerant gas pipe 24 to the first refrigerant gas pipe 22, and then, through the first refrigerant gas pipe 22, is sent to the condenser 15. Further, part of the refrigerant gas is sent from the common refrigerant gas pipe 24 to the second refrigerant gas pipe 23, and then, through the second refrigerant gas pipe 23, is sent to the condenser 15.

In the condenser 15, the refrigerant gas is condensed by radiating heat. The refrigerant liquid generated by condensation falls by gravity in the condenser 15 and flows out from the bottom of the condenser 15 to the refrigerant liquid pipe 20. The refrigerant liquid flowing through the refrigerant liquid pipe 20 flows from the common refrigerant liquid pipe 21 to the cooler 11 through the refrigerant liquid introducing portion 12. Thus, in the ebullient cooling device 10, the refrigerant is circulated between the coolers 11 and the condenser 15 while changing phase between the liquid phase and the gas phase. Thus, the heat is conducted from the coolers 11 to the condenser 15 and the battery stacks 6 is cooled.

3. Structure of Battery-Mounted Vehicle

Figure 4:
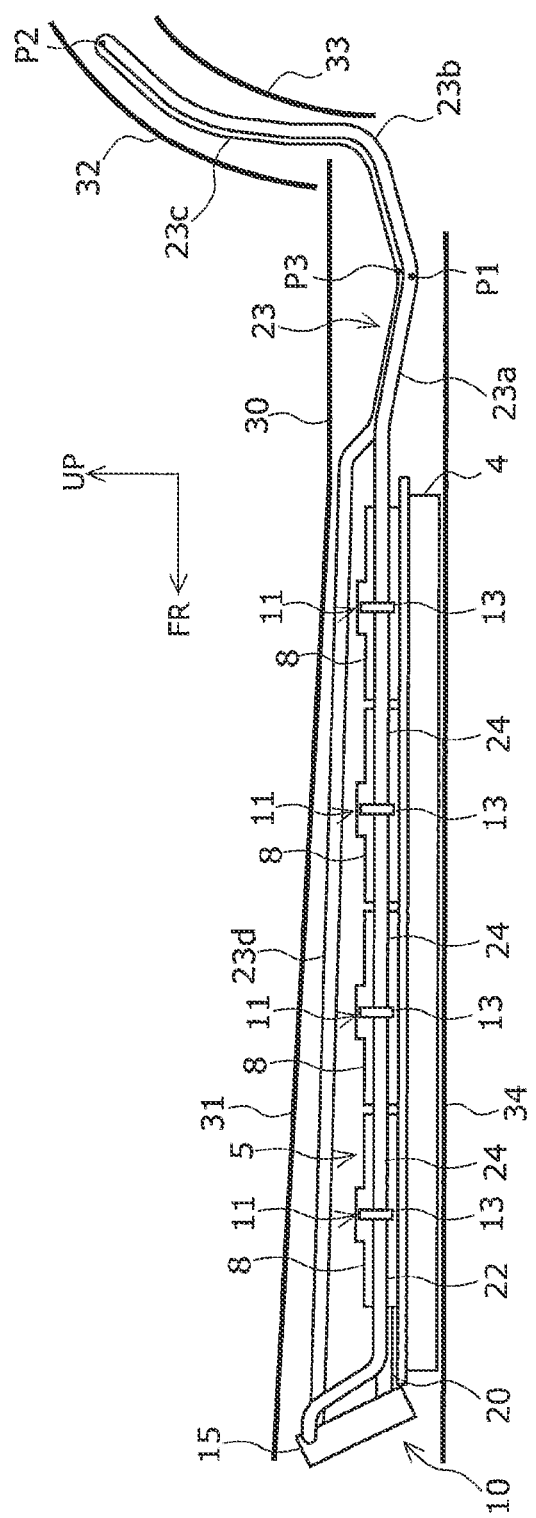
FIG. 4 is a schematic side view illustrating a mounting position of the battery pack in the battery-mounted vehicle and a routing of a refrigerant gas pipe according to the embodiment of the present disclosure.

The structure of the battery-mounted vehicle according to the present embodiment, including the mounting position of the battery pack 2 and the routing of the second refrigerant gas pipe 23, will be described with reference to FIGS. 4 to 7. FIG. 4 is a schematic side view illustrating the mounting position of the battery pack 2 in the battery-mounted vehicle according to the present embodiment. Battery pack 2 is mounted under a floor panel 30 of the vehicle. The bottom surface of the battery pack 2, that is, the bottom surface of the tray 4 is covered by an under guard 34.

Further, FIG. 4 schematically illustrates the routing of the refrigerant gas pipes 22, 23 and 24 in the battery-mounted vehicle according to the present embodiment. In the battery-cooler unit 5, the common refrigerant gas pipe 24 is incorporated. The common refrigerant gas pipe 24 connects the refrigerant gas discharging portions 13 of the coolers 11. The first refrigerant gas pipe 22 extends from the foremost refrigerant gas discharging portion 13 in the front-back direction of the vehicle toward the front of the vehicle (first direction), and is connected to the condenser 15. The second refrigerant gas pipe 23 extends toward the back of the vehicle (second direction) from the rearmost refrigerant gas discharging portion 13. A first part of 23a of the second refrigerant gas pipe 23 is the portion from the refrigerant gas discharging portion 13 of the rearmost cooler 11 to the first position P1 which is the lowermost arrival point of the second refrigerant gas pipe 23 in the up-down direction of the vehicle. The first position P1 is located below the floor panel 30 and above the under guard 34.

From the first position P1 below the floor panel 30, the second refrigerant gas pipe 23 extends above the floor panel 30 through the gap between a side member outer panel (first panel) 32 constituting the outer shell of the vehicle and a wheel house outer panel (second panel) 33 constituting a rear wheel house. In the gap between the side member outer panel 32 and the wheel house outer panel 33, the second refrigerant gas pipe 23 is curved along the rear wheel house and extends to a second position P2 which is the highest arrival point in the up-down direction of the vehicle. A second part 23b of the second refrigerant gas pipe 23 is the portion from the first position P1 to the second position P2. The first part 23a and the second part 23b of the second refrigerant gas pipe 23 is arranged such that the distance from the refrigerant gas discharging portion 13 of the rearmost cooler 11 to the second position P2 is to be larger than the distance from the refrigerant gas discharging portion 13 of the rearmost cooler 11 to the first position P1.

The second refrigerant gas pipe 23 is folded back at a second position P2, extends below the floor panel 30 through the gap between the side member outer panel 32 and the wheel house outer panel 33. Even folded path from the second position P2, the second refrigerant gas pipe 23 is curved along the wheel house. A third part 23c of the second refrigerant gas pipe 23 is the portion from the second position P2 to the third position P3 which is the lowermost arrival point in the up-down direction of the vehicle. The third position P3 is located below the floor panel 30 and above the under guard 34.

From the third position P3 below the floor panel 30, the second refrigerant gas pipe 23 extends obliquely upward toward the front in the front-back direction of the vehicle. The end of the second refrigerant gas pipe 23 is connected to the condenser 15. A fourth part 23d of the second refrigerant gas pipe 23 is the portion from the third position P4 to the condenser 15. The fourth part of 23d of the second refrigerant gas pipe 23 is passed through a floor tunnel 31 which raises upward from the floor panel 30 in the central in the width direction of the vehicle and extends in the front-back direction of the vehicle.

Figure 5:
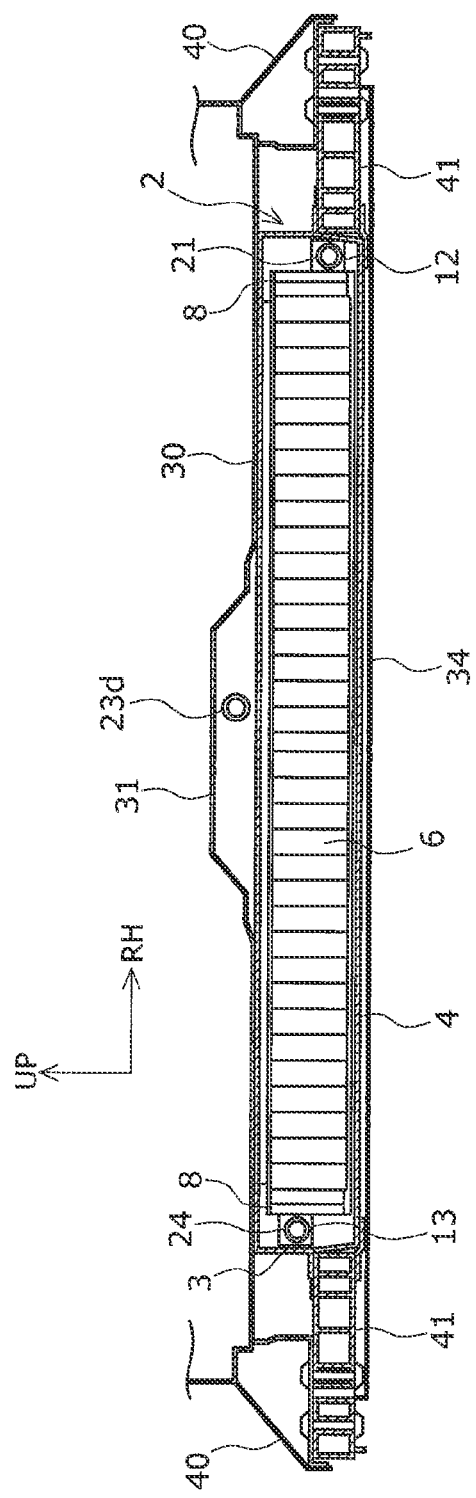
FIG. 5 is a cross-sectional view of the vicinity of the mounting position of the battery pack illustrating the structure of the battery-mounted vehicle according to the embodiment in the present disclosure.

FIG. 5 is a cross-sectional view of the vicinity of the mounting position of the battery pack 2 illustrating the structure of the battery-mounted vehicle according to the present embodiment. Both sides of the floor panel 30 is sandwiched by a pair of rockers 40 extending in the front-back direction of the vehicle. The battery pack 2 is disposed between the right and the left lockers 40. Both sides of the battery pack 2 are respectively fixed to the rockers 40 via brackets 41. The mounting position of the battery pack 2 on the vehicle just falls just below the floor tunnel 31. The under guard 34 is fixed to the left and the right brackets 41, covering the bottom surface of the battery pack 2.

The battery pack 2 is provided with the tray 4 on which the battery stacks 6 is mounted and a cover 3 covering the tray 4 and the battery stacks 6 on the tray 4. Between each of the left and right side surfaces of the battery housing chamber which is formed by the tray 4 and the cover 3 and each of the left and right end plates 8, a gap is provided. In the gap on the right side in the left-right direction of the vehicle, the common refrigerant liquid pipe 21 is disposed. The refrigerant liquid introducing portions 12 of the coolers 11 protruding from the end plate 8 (see FIG. 2) are connected to the common refrigerant liquid pipe 21. In the gap on the left side in the left-right direction of the vehicle, the common refrigerant gas pipe 24 is disposed. The refrigerant gas discharging portions 13 of the coolers 11 protruding from the end plate 8 (see FIG. 2) are connected to the common refrigerant gas pipe 24.

Whereas the common refrigerant liquid pipe 21 and the common refrigerant gas pipe 24 are disposed in the battery housing chamber constituted of the tray 4 and the cover 3, the second refrigerant gas pipe 23 is disposed outside the battery housing chamber. Space is provided between the upper surface of the cover 3 of the battery pack 2 and the floor tunnel 31. The fourth part 23d of the second refrigerant gas pipe 23 is disposed in this space.

Figure 6:
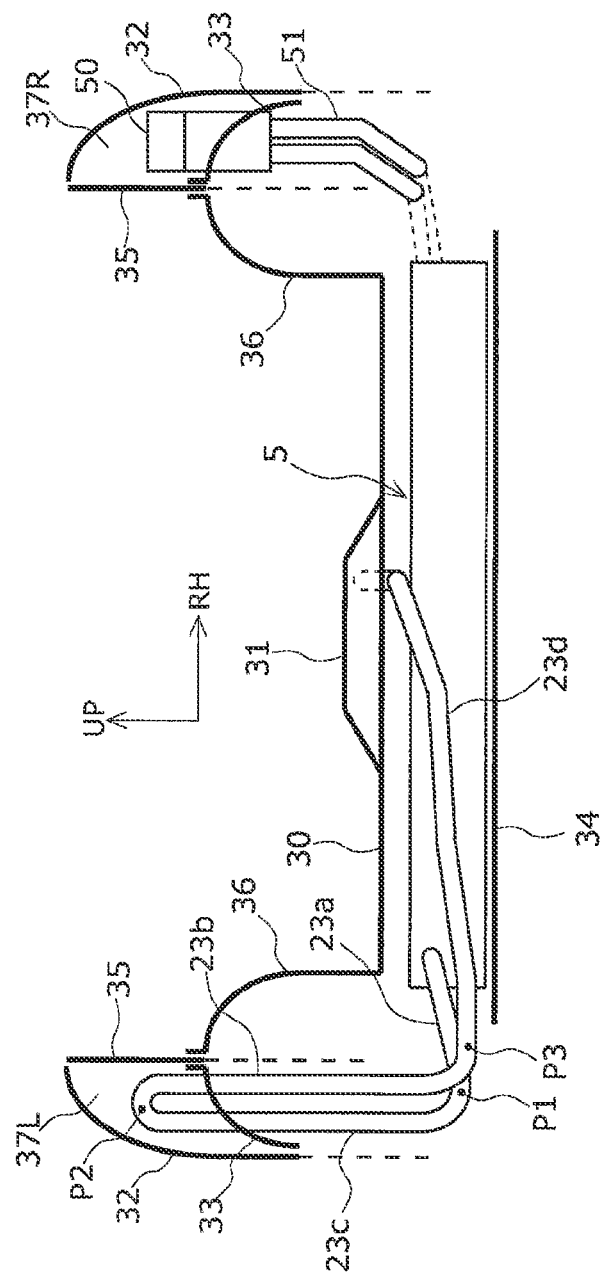
FIG. 6 is a schematic rear view illustrating a structure of the battery-mounted vehicle according to the embodiment of the present disclosure, in particular, a structure of the periphery of a battery-cooler unit when viewed from the rear by cutting the vehicle in the width direction in the vicinity of a rear wheel house.

FIG. 6 is a schematic rear view illustrating the structure of the battery-mounted vehicle according to the present embodiment. Specifically, FIG. 6 schematically represents the structure of the periphery of the battery pack 2 when viewed from the rear by cutting the vehicle in the width direction in the vicinity of the rear wheel house. The rear wheel house is composed of a wheel house inner panel 36 forming an inner portion thereof and the wheel house outer panel 33 forming an outer portion thereof. The lower end of the wheel house inner panel 36 is joined to the floor panel 30. Between the upper end of the wheel house inner panel 36 and the upper end of the wheel house outer panel 33, the lower end of the roof side inner panel 35 for separating the interior of the vehicle cabin from the outside of the vehicle cabin is sandwiched and is joined together. The side member outer panel 32 composed of the outer shell of the vehicle is mounted on the outside of the wheel house outer panel 33.

There is a gap between the side member outer panel 32 and the wheel house outer panel 33. Wheel house upper spaces 37L and 37R surrounded by the side member outer panel 32, the wheel house outer panel 33, and the roof side inner panel 35 are provided on the top of the rear wheel house. The wheel house upper space 37L on the left side of the vehicle, the second refrigerant gas pipe 23 is passed. The second part 23b of the second refrigerant gas pipe 23, raising through the wheel house upper space 37L from below the floor panel 30, extends to the second position P2, and the third part 23c extends below the floor panel 30 from the second position P2. In the wheel house upper space 37R on the right side of the vehicle, a charger 50 for charging the battery stacks 6 (reference FIG. 1) which are accommodated in the battery pack 2 is disposed. Cable 51 connecting the charger 50 and the battery pack 2 is passed through the wheel house upper space 37R.

4. Features and Benefits

Features and advantages of the battery-mounted vehicle according to the present embodiment will be described. However, these are some of the features possessed by the examples in the present disclosure, and the examples in the present disclosure are not limited by the features and advantages listed below.

The ebullient cooling device 10 of the battery-mounted vehicle according to the present embodiment, as illustrated in FIG. 2, includes a second refrigerant gas pipe 23 for connecting the battery-cooler unit 5 to the condenser 15 separately from the first refrigerant gas pipe 22 for also connecting the battery-cooler unit 5 to the condenser 15. The second refrigerant gas pipe 23 extends in a direction opposite to the first refrigerant gas pipe 22 with respect to the coolers 11. Thus, when the refrigerant liquid enters one of the refrigerant gas pipe of the two refrigerant gas pipes 22 and 23 by the incline and acceleration and deceleration of the vehicle, the refrigerant gas is returned from the other refrigerant gas pipe to the condenser 15.

Further, the first refrigerant gas pipe 22 extends from the battery-cooler unit 5 in one direction toward the front of the vehicle. On the other hand, the second refrigerant gas pipe 23, after extending toward the rear of the vehicle, extends toward the front of the vehicle while changing the direction by bending or curving a plurality of times. Therefore, when the refrigerant liquid enters deeply the second refrigerant gas pipe 23, the refrigerant liquid which has entered possibly stays inside the second refrigerant gas pipe 23. However, as illustrated in FIG. 4, the second refrigerant gas pipe 23, from below the floor panel 30, extends above the floor panel 30 through the gap between the side member outer panel 32 and the wheel house outer panel 33, and extends toward the condenser after returning below the floor panel 30. Thereby, the refrigerant liquid is prevented from being accumulated in the second refrigerant gas pipe 23 when the vehicle is greatly inclined.

Figure 7:
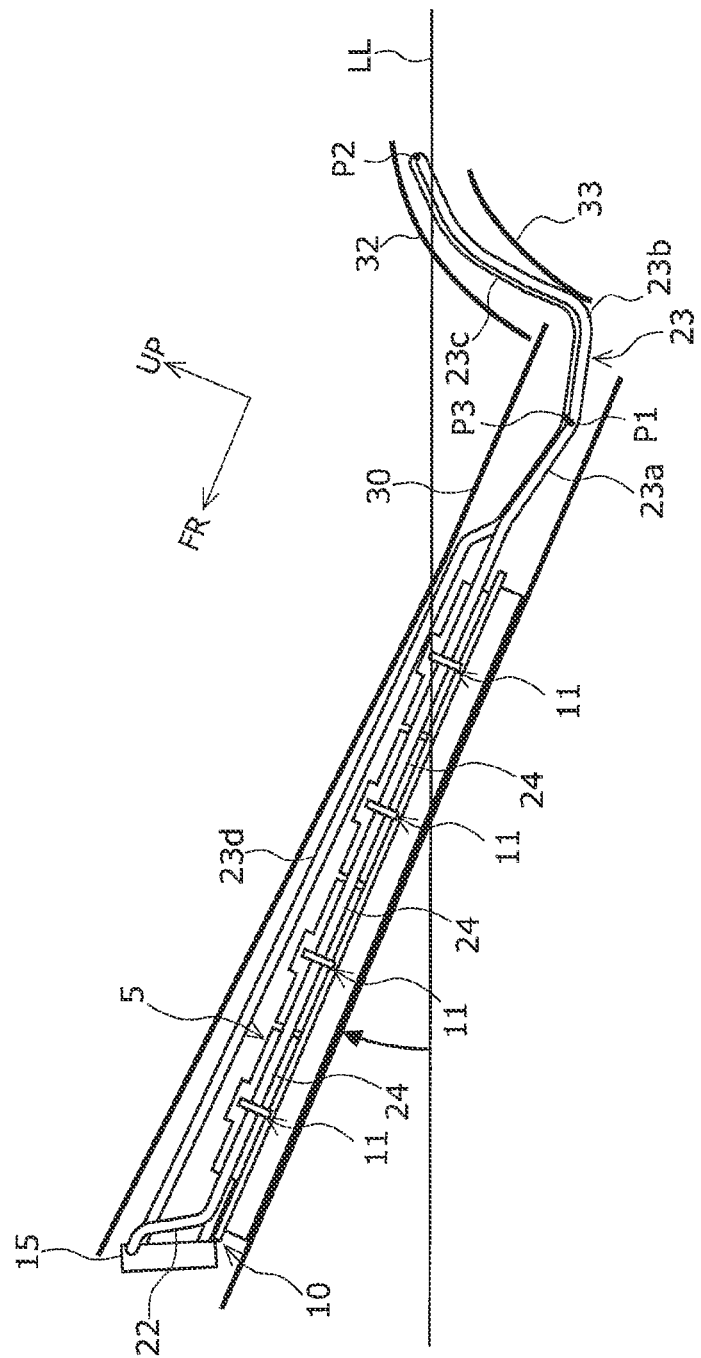
FIG. 7 is a diagram illustrating the effect of the battery-mounted vehicle according to the embodiment in the present disclosure.

The above operation will be described in detail. For example, when the vehicle inclines backward as illustrated in FIG. 7, the liquid level LL of the refrigerant liquid in the ebullient cooling device 10 also inclines. Thus, the refrigerant liquid enters from the first part 23a of the second refrigerant gas pipe 23 to the second part 23b. However, because the second position P2 which is the highest arrival point of the second refrigerant gas pipe 23 is a position higher than the floor panel 30, the refrigerant liquid will not exceed the second position P2 and will not penetrate into the third part of 23c of the second refrigerant gas pipe 23 even when the vehicle is greatly backward inclined. Therefore, when the vehicle is returned to horizontal or turned to forward inclination from the backward inclination, the refrigerant liquid entering the second refrigerant gas pipe 23 returns to the coolers 11 without staying inside. Thereby, flow of the refrigerant gas from the coolers 11 via the second refrigerant gas pipe 23 to the condenser 15 is ensured.

Further, the second refrigerant gas pipe 23 is disposed such that the distance from the refrigerant gas discharging portion 13 of the rearmost cooler 11 to the second position P2 is larger than the distance from the refrigerant gas discharging portion 13 of the rearmost cooler 11 to the first position P1. Note that the distance here is a linear distance in the pitch plane of the vehicle. By such an arrangement of the second refrigerant gas pipe 23, the refrigerant liquid which has entered the second part 23b by the backward inclination of the vehicle flows toward the first part 23a when the vehicle is swung back and forth (pitching motion). Thereby, the refrigerant liquid which has entered to the second part 23b may be possibly be prevented from entering the third part 23c beyond the second position P2. That is, since the second position P2 is set at a position higher than the floor panel 30, and the distance from the refrigerant gas discharging portion 13 of the rearmost cooler 11 to the second position P2 is larger than the distance to the first position P1, the refrigerant liquid is prevented from being accumulated in the second refrigerant gas pipe 23 by the vehicle inclination, acceleration or deceleration, pitching motion or the like.

As illustrated in FIGS. 4 and 6, since the second refrigerant gas pipe 23 extends upward through the gap between the side member outer panel 32 and the wheel house outer panel 33, the second refrigerant gas pipe 23 is also suppressed from affecting the cabin space. Because the side member outer panel 32 and the wheel house outer panel 33 is a member constituting the skeleton or the outer shell of the vehicle, by passing the second refrigerant gas pipe 23 in the gap, the vehicle skeleton or outer shell is possible to protect the second refrigerant gas pipe 23 while effectively utilizing the available space. Further, as illustrated in FIGS. 4 and 5, since the second refrigerant gas pipe 23 is connected to the condenser 15 through the floor tunnel 31 raising from the floor panel 30, the second refrigerant gas pipe 23 is possibly protected from the impact from the outside while effectively utilizing the available space in the floor tunnel 31.

Further, as shown in FIG. 6, the second refrigerant gas pipe 23 is disposed so as to pass through the wheel house upper space 37L on the opposite side to the wheel house upper space 37R in which the charger 50 and the cable 51 is accommodated. By such an arrangement of the second refrigerant gas pipe 23, interference between the charger 50 and the second refrigerant gas pipe 23 or between the cable 51 and the second refrigerant gas pipe 23 is prevented. Thereby, the mountability of both the charger 50 and the ebullient cooling device 10 is possibly improved.

5. Modified Example

Figure 8:
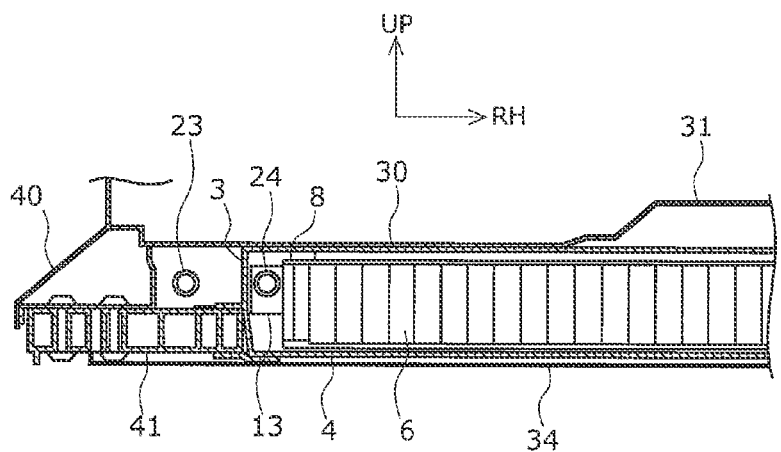
FIG. 8 is a cross-sectional view illustrating a first modification of the routing of the refrigerant gas pipe in the battery-mounted vehicle according to the embodiment in the present disclosure.

Hereinafter, modifications of the battery-mounted vehicle according to the present embodiment will be described. FIG. 8 is a cross-sectional view illustrating a first modification of the routing of the refrigerant gas pipe 23 in the battery-mounted vehicle according to the present embodiment. In the first modification, the second refrigerant gas pipe 23 is passed through the gap between the battery housing chamber formed by the tray 4 and the cover 3. Specifically, a fourth part extending from the third position to the condenser 15 (see FIG. 2) is passed through the gap between the battery housing chamber and the rocker 40. By such arrangement of the second refrigerant gas pipe 23, while effectively utilizing the available space under the floor panel 30 between the rocker 40 and the battery housing chamber, the second refrigerant gas pipe is possibly protect from the impact from the outside by the rocker 40.

Figure 9:
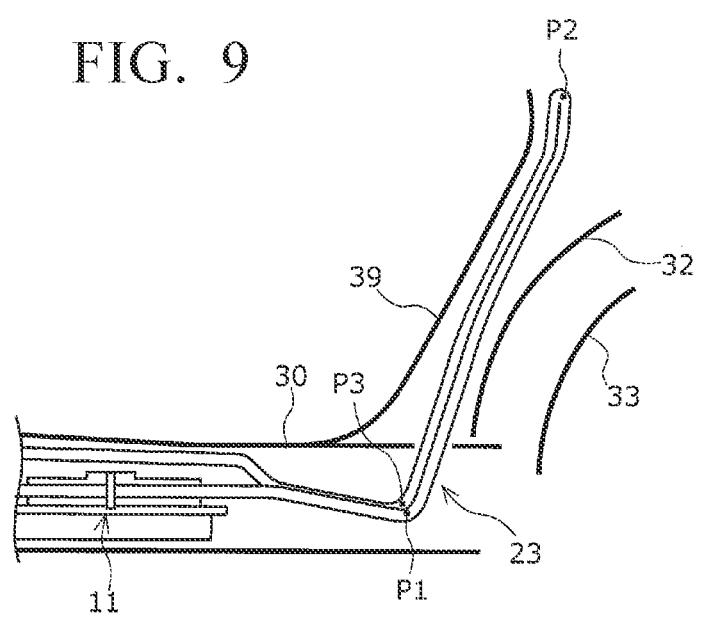
FIG. 9 is a schematic side view illustrating a second modification of the routing of the refrigerant gas pipe in the battery-mounted vehicle according to the embodiment in the present disclosure.

FIG. 9 is a side view illustrating a second modification of the routing of the refrigerant gas pipe 23 in the battery-mounted vehicle according to the present embodiment. In the second modification, the second refrigerant gas pipe 23 is passed through a rear pillar 39 extending in the up-down direction of the vehicle. The rear pillar 39 is formed in a closed cross-sectional structure continuous in the up-down direction of the vehicle by a quarter pillar inner force (not shown) and a quarter pillar outer force (not shown). The quarter pillar inner force has an open hat-shaped cross-sectional shape toward the outside of the vehicle cabin. The quarter pillar outer force has an open hat-shaped cross-sectional shape toward the outside of the vehicle cabin. The second refrigerant gas pipe 23, from the first position P1 below the floor panel 30, extends above the floor panel 30 through the rear pillar 39, folds back at a second position P2 in the rear pillar 39, and returns to the third position P3 below the floor panel 30. By such an arrangement of the second refrigerant gas pipe 23, it is possible to extend the second refrigerant gas pipe 23 to a high position of the vehicle and the rear pillar 39 constituting the skeleton of the vehicle possibly protect the second refrigerant gas pipe 23.

Figure 10:
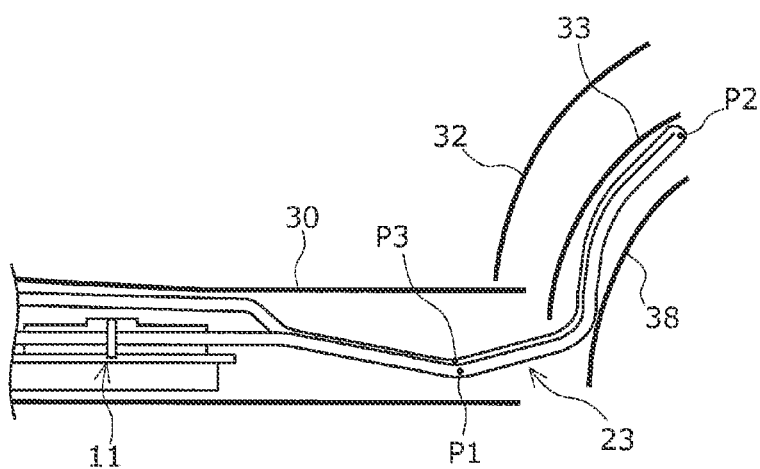
FIG. 10 is a schematic side view illustrating a third modification of the routing of the refrigerant gas pipe in the battery-mounted vehicle according to the embodiment in the present disclosure.
Figure 11:
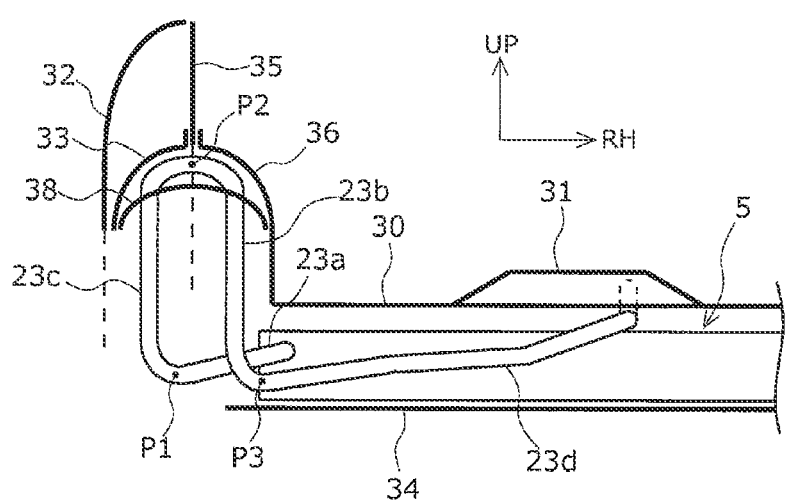
FIG. 11 is a schematic rear view illustrating a third modification of the routing of the refrigerant gas pipe in the battery-mounted vehicle according to the embodiment in the present disclosure.

FIG. 10 is a schematic side view illustrating a third modification of the routing of the refrigerant gas pipe 23 in the battery-mounted vehicle according to the present embodiment. FIG. 11 is a rear view thereof. As illustrated in FIG. 11, the rear wheel house is composed of the wheel house outer panel 33 and the wheel house inner panel 36, and, on its inside, the wheel house inner cover 38 which is a resin cover for protecting the rear wheel house is provided. Gaps are provided between the wheel house outer panel 33 and the wheel house inner cover 38 and between the wheel house inner panel 36 and the wheel house inner cover 38.

In the third modification, as illustrated in FIG. 10, from the first position P1 below the floor panel 30, the second refrigerant gas pipe 23 extends above the floor panel 30 through the inside of the wheel house inner cover 38, and folds back at the second position P2 in the wheel house inner cover 38 to return to the third position P3 below the floor panel 30. By such an arrangement of the second refrigerant gas pipe 23, the available space formed between the wheel house outer panel 33 and the wheel house inner cover 38, and the available space formed between the wheel house inner panel 36 and the wheel house inner cover 38 are effectively utilized. In FIG. 11, the second part 23b and the third part 23c of the second refrigerant gas pipe 23 are aligned in the width direction of the vehicle. By such an arrangement, it is possible to place the second refrigerant gas pipe 23 in a thin gap in the wheel house inner cover 38. In FIG. 11, the third part 23c is disposed under the wheel house outer panel 33 and the second part 23b is disposed under the wheel house inner panel 36. However, it may be arranged in the opposite arrangement. Also, both the second part of 23b and the third part 23c may be disposed under the wheel house outer panel 33, or both may be disposed under the wheel house inner panel 36.

Figure 12:
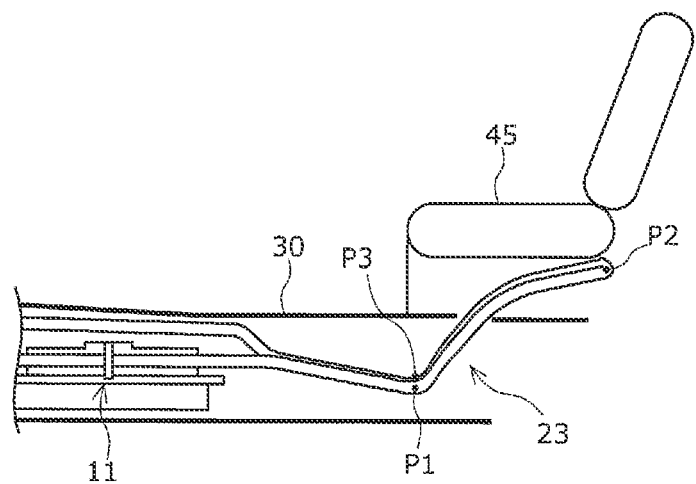
FIG. 12 is a schematic side view illustrating a fourth modification of the routing of the refrigerant gas pipe in the battery-mounted vehicle according to the embodiment in the present disclosure.

FIG. 12 is a schematic side view showing a fourth modification of the routing of the refrigerant gas pipe 23 in the battery-mounted vehicle according to the present embodiment. In the fourth modification, the second refrigerant gas pipe 23 is passed through the gap between the rear seat 45 and the floor panel 30. The second refrigerant gas pipe 23, from the first position P1 below the floor panel 30 extends above the floor panel 30, and returns to the third position P3 below the floor panel 30 is folded back at a second position P2 below the rear seat 45. By passing the second refrigerant gas pipe 23 inside the vehicle, it is possible to protect the second refrigerant gas pipe 23 from an impact from the outside. Further, a portion through which the second refrigerant gas pipe 23 passes is the gap between the rear seat 45 and the floor panel 30 i.e., a gap of the interior. Thereby, the influence on the vehicle interior space is suppressed.

Figure 13:
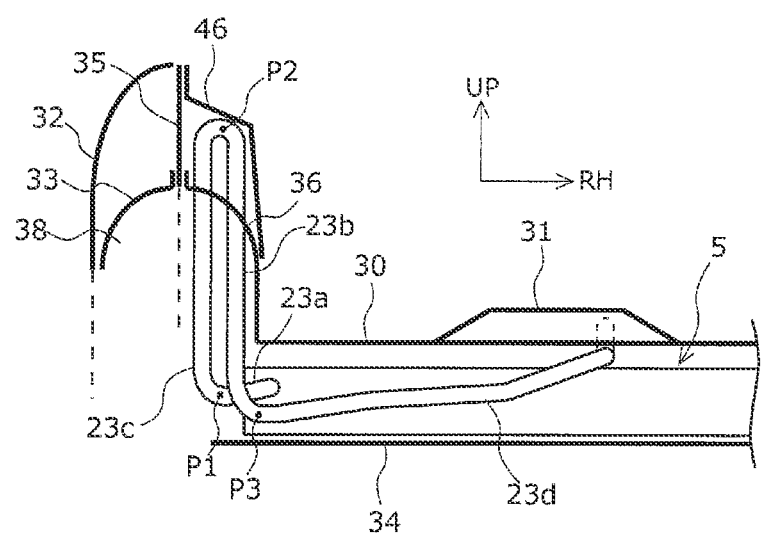
FIG. 13 is a schematic rear view illustrating a fifth modification of the routing of the refrigerant gas pipe in the battery-mounted vehicle according to the embodiment in the present disclosure.

FIG. 13 is a schematic rear view illustrating a fifth modification of the routing of the refrigerant gas pipe 23 in the battery-mounted vehicle according to the present embodiment. In the fifth modification, the second refrigerant gas pipe 23 is passed through the gap between the wheel house inner panel 36 and an inner panel 46 covering the upper portion of the wheel house inner panel 36. The interior panel 46 is, for example, a resin panel forming a design surface of the vehicle interior. The second refrigerant gas pipe 23, from the first position P1 below the floor panel 30, extends above the floor panel 30 along the rear wheel house, folds back at the second position P2 inside the interior panel 46 to return the third position P3 below the floor panel 30. By passing the second refrigerant gas pipe 23 inside the interior panel 46, it is possible to protect the second refrigerant gas pipe 23 from an impact from the outside and to suppress the influence on the vehicle interior space.

In addition to the modifications described above, the battery-mounted vehicle according to the present embodiment may be modified as follows. For example, the mounting direction of the battery pack 2 to the vehicle may be reversed back and forth. Referring to FIG. 2, the battery pack 2 may be mounted such that the condenser 15 is positioned in the rear direction of the vehicle relative to the battery-cooler unit 5. In this case, the second refrigerant gas pipe 23 may be disposed along a front wheel house. Also, the second refrigerant gas pipe 23 may be disposed in the front pillar or in the gap of the interior, such as, under the back, and a console of a dashboard.

Figure 14:
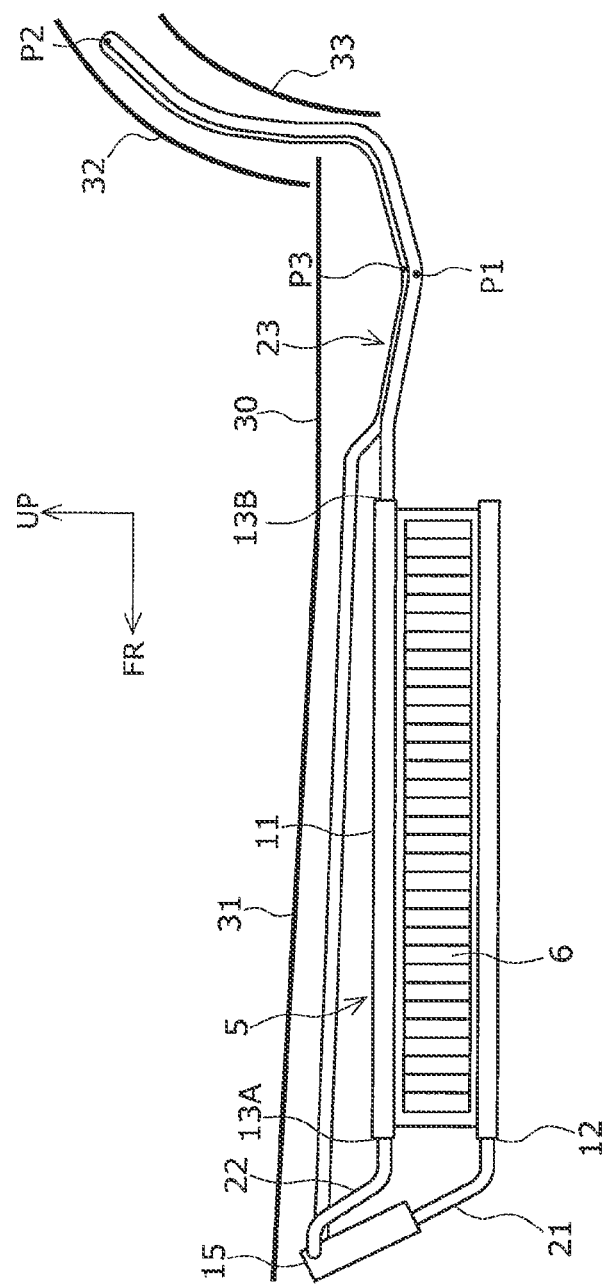
FIG. 14 is a schematic side view illustrating a modification of the mounting mode of a battery stack in the battery-mounted vehicle according to the embodiment in the present disclosure.

Further, in the battery-mounted vehicle according to the present embodiment, the battery stacks are arranged in the longitudinal direction of the vehicle such that the longitudinal direction of the battery stacks are as along the width direction of the vehicle. However, as a modification illustrated in FIG. 14, the battery stack 6 may be disposed with its longitudinal direction toward the front-back direction of the vehicle. FIG. 14 is a schematic side view illustrating a modification of the mounting mode of the battery stack 6 in the battery-mounted vehicle according to the present embodiment.

In this case, the cooler 11 is disposed with its longitudinal direction toward the longitudinal direction of the vehicle. The battery-cooler unit 5 is configured such that the side surfaces of the battery stack 6 are respectively fixed on both sides of the cooler 11 in the width direction of the vehicle. The condenser 15 is disposed at a position higher than the coolers 11 in the up-down direction of the vehicle. The condenser 15 is also located away from the battery-cooler unit 5 in the front-back direction of the vehicle. For example, the condenser 15 may be located ahead of the battery-cooler unit 5. The end of the vehicle front side of the cooler 11, the refrigerant liquid introducing portion 12 and the first refrigerant gas discharging portion 13A is provided. The refrigerant liquid introducing portion 12 is located at the lower end, and is connected to the lower portion of the condenser 15 by the refrigerant liquid pipe 21. The first refrigerant gas discharging portion 13A is located at the upper end, and is connected to the upper portion of the condenser 15 by the first refrigerant gas pipe 22. The end of the vehicle rear side of the cooler 11, the second refrigerant gas discharging portion 13B is provided. The second refrigerant gas discharging portion 13B is located at the upper end, and communicates with the first refrigerant gas discharging portion 13A in the cooler 11.

From the second refrigerant gas discharging portion 13B, the second refrigerant gas pipe 23 extends in a direction opposite to the direction toward the condenser 15. The second refrigerant gas pipe 23, from the first position P1 below the floor panel 30, extends upwardly through the gap of the member 32, 33 constituting the upper portion of the vehicle (e.g., the gap between the side member outer panel and the wheel house outer panel), folds back at the second position P2 above the floor panel 30 to return to the lower again, and extends toward the condenser 15 from the third position below the floor panel 30. By such arrangement of the second refrigerant gas pipe 23, similarly to the case of the above-described embodiment, a decrease in cooling performance due to accumulation of the refrigerant liquid in the refrigerant gas pipes 22 and 23 is suppress without sacrificing the mountability of the ebullient cooling device 10.

As can also be seen from the example illustrated in FIG. 14, in the battery-cooler unit 5, the batteries may be arranged side by side in the front-back direction of the vehicle or in the width direction of the vehicle. Further, the cooler may be arranged side by side such that its longitudinal direction is along the front-back direction of the vehicle, or along the width direction of the vehicle. The battery-cooler unit 5 may also be configured with a single cell or a single battery stack and a single cooler unit.

What is claimed is:

1. A battery-mounted vehicle mounted one or more batteries under a floor panel, comprising:
    a battery-cooler unit comprising one or more coolers and one or more batteries to which attached the one or more coolers, and cooling the one or more batteries by heat exchange of the one or more batteries with a refrigerant liquid in one or more said coolers;
    a condenser disposed at a position horizontally away from the battery-cooler unit and condensing refrigerant gas by heat radiation so as to obtain the refrigerant liquid; and
    a refrigerant liquid pipe for guiding the refrigerant liquid from the condenser to the battery-cooler unit; and
    a plurality of refrigerant gas pipes for guiding the refrigerant gas generated by vaporization of the refrigerant liquid from the battery-cooler unit to the condenser, wherein
    the plurality of refrigerant gas pipes comprises:
        a first refrigerant gas pipe extending from the battery-cooler unit in a first direction toward the condenser, and connecting the condenser and the cooler; and
        a second refrigerant gas pipe extending from the battery-cooler unit in a second direction opposite to the first direction, and connected to the condenser by being bended or curved a plurality of times, and wherein
    the second refrigerant gas pipe extends upwardly through a gap of a member constituting an upper portion of the vehicle from a first position below the floor panel, folds back at a second position above the floor panel, and returns downward, and extends toward the condenser from a third position below the panel.

2. The battery-mounted vehicle according to claim 1, wherein the member constituting the upper portion of the vehicle is a member constituting skeleton or outer shell of the vehicle.

3. The battery-mounted vehicle according to claim 2, wherein the second refrigerant gas pipe is disposed along a wheel house.

4. The battery-mounted vehicle according to claim 3, wherein the second refrigerant gas pipe extends upward through a gap formed between a panel constituting the wheel house and a wheel house inner cover provided on the inside of the wheel house to protect the wheel house, folds back in the gap, and extends downward.

5. The battery-mounted vehicle according to claim 3, wherein the second refrigerant gas pipe extends upward through a gap formed between a first panel constituting the outer shell of the vehicle and a second panel constituting the wheel house, folds back in the gap, and extends downward.

6. The battery-mounted vehicle according to claim 5, wherein
    the first panel and the second panel are provided on the left and the right of the vehicle,
    a charger for charging the battery is disposed in a gap formed between the first panel and the second panel of one side of the left or the right, and
    the second refrigerant gas pipe is disposed in the gap formed between the first panel and the second panel of the other side of the left or the right.

7. The battery-mounted vehicle according to claim 2, wherein the second refrigerant gas pipe is disposed in a pillar extending in an up-and-down direction of the vehicle.

8. The battery-mounted vehicle according to claim 1, wherein the member constituting the upper portion of the vehicle is a member constituting interior of the vehicle.

9. The battery-mounted vehicle according to claim 1, wherein the second refrigerant gas pipe is disposed such that a distance from a connection portion with the battery-cooler unit to the second position is larger than a distance from the connection portion to the first position.

10. The battery-mounted vehicle according to claim 1, wherein the second refrigerant gas pipe extends, from the third position to the condenser, through a floor tunnel formed by being raised from the floor panel.

11. The battery-mounted vehicle according to claim 1, wherein the second refrigerant gas pipe extends, from the third position to the condenser, through a gap between a skeleton member or a reinforcing member which is disposed on the side of the vehicle under the floor panel so as to extend in a front-back direction of the vehicle, and battery housing chamber for accommodating the battery.

12. The battery-mounted vehicle according to claim 1, wherein the battery-cooler unit includes a common refrigerant gas pipe to which a plurality of the coolers are connected in parallel, the first refrigerant gas pipe is connected to an end in a first direction of the common refrigerant gas pipe, the second refrigerant gas pipe is connected to other end in a second direction of the common refrigerant gas pipe.

\* \* \* \* \*